United States Patent
Quinton et al.

(10) Patent No.: US 12,027,738 B2
(45) Date of Patent: Jul. 2, 2024

(54) FUEL CELL WITH ANNULAR STRUCTURE

(71) Applicant: SAFRAN POWER UNITS, Toulouse (FR)

(72) Inventors: Romain Quinton, Moissy-cramayel (FR); Jean-Baptiste Jollys, Moissy-cramayel (FR); Théophile Horde, Moissy-cramayel (FR)

(73) Assignee: SAFRAN POWER UNITS, Toulouse (FR)

( * ) Notice: Subject to any disclaimer, the term of this patent is extended or adjusted under 35 U.S.C. 154(b) by 573 days.

(21) Appl. No.: 17/294,962

(22) PCT Filed: Dec. 9, 2019

(86) PCT No.: PCT/EP2019/084129
§ 371 (c)(1),
(2) Date: May 18, 2021

(87) PCT Pub. No.: WO2020/120354
PCT Pub. Date: Jun. 18, 2020

(65) Prior Publication Data
US 2022/0013802 A1    Jan. 13, 2022

(30) Foreign Application Priority Data
Dec. 12, 2018  (FR) ..................... 1872752

(51) Int. Cl.
*H01M 8/2475*    (2016.01)
*H01M 8/248*    (2016.01)
*H01M 8/249*    (2016.01)

(52) U.S. Cl.
CPC ......... *H01M 8/2475* (2013.01); *H01M 8/248* (2013.01); *H01M 8/249* (2013.01)

(58) Field of Classification Search
CPC ..... H01M 8/2475; H01M 8/248; H01M 8/249
See application file for complete search history.

(56) References Cited

U.S. PATENT DOCUMENTS 5,993,987 A    11/1999    Wozniczka et al.

FOREIGN PATENT DOCUMENTS

| EP | 3007258 A1 | 4/2016 |
| WO | WO 2018/113035 A1 | 6/2018 |

OTHER PUBLICATIONS

Search Report from the French Intellectual Property Office on corresponding FR application (FR1872752) dated Aug. 2, 2019.
International Search Report and Written Opinion on corresponding PCT application (PCT/EP2019/084129) from International Searching Authority (EPO) dated Feb. 27, 2020.

*Primary Examiner* — Eugenia Wang
(74) *Attorney, Agent, or Firm* — Alumen IP Law PC

(57) ABSTRACT

The invention relates to a fuel cell comprising a plurality of modules mounted in series with one another so as to form a peripheral structure, each module comprising two end members and a stack of electrochemical cells mounted between two end members, each end member including a mounting face in contact with one of the ends of a stack and an interface face in contact with another interface face of another end member, the mounting face and the interface face being angularly spaced apart by an angle (α) which is between 0.5° and 60°.

14 Claims, 5 Drawing Sheets

FUEL CELL WITH ANNULAR STRUCTURE

TECHNICAL FIELD

The present invention relates to the field of fuel cells, especially in the field of aeronautics, and more particularly to the structure of a fuel cell.

BACKGROUND

A fuel cell is used to produce electric energy from an electrochemical reaction. Conventionally, a fuel cell is formed by a stack of cells in which the electrochemical reaction takes place. The cells comprise ducts through which various fluids, especially necessary for the electrochemical reaction and cooling, circulate. Seals are mounted between each cell so as to make the ducts sealed.

The fuel cell further comprises two end plates which are mounted on either side of the stack and to which a compression load is applied in order to sandwich the cells and provide sealing between the cells.

In order to ensure sealing over the entire surface of the cells, it is necessary to apply a uniform load over the entire surface of the cells, especially by means of traction members known to the person skilled in the art as tie rods. In a known manner, the end plates have large sizes in relation to the cells in order to have a high rigidity for avoiding any flexural deformation of the end plates upon compressing the stack, in other words upon tensioning the traction members. However, such end plates have large overall size and weight.

Today, in order to produce a larger amount of electric energy, there are fuel cells comprising several stacks of cells. As each stack is compressed by means of end plates, the overall size and weight of the fuel cell are thereby increased, which is a major drawback.

There is therefore a need for a fuel cell comprising several stacks that has limited overall size and weight.

SUMMARY

For this purpose, the invention relates to a fuel cell comprising a plurality of stacks of electrochemical cells, the stacks being associated in series with each other so as to form a peripheral structure.

By "peripheral structure", it is meant a loop assembly of stacks defining an empty center. Such a peripheral structure can especially take the form of a circular or polygonal structure with an empty center.

By virtue of the fuel cell according to the invention, the overall size of a fuel cell comprising several stacks is limited by virtue of the peripheral structure of the fuel cell allowing space in the center of this structure to be released. Furthermore, a series structural arrangement advantageously allows the first stack to be in contact with the last stack. It is advantageously no longer necessary to use end plates for each stack. By virtue of the invention, the fuel cell has a limited overall size and a reduced weight.

Preferably, the fuel cell comprises a plurality of modules mounted in series with each other so as to form the peripheral structure, each module comprising two end members and a stack mounted between two end members. The fuel cell thus has a modular structure which makes a maintenance operation of the fuel cell easy. Each module can be replaced independently. Preferably, the modules are identical to each other.

Preferably, each module has holding means connecting the end members to hold the stack restrained between the end members. Such holding means facilitate the assembly of the stacks in a modular fashion. In other words, a module can be formed with a stack and two end members that are held together to facilitate their assembly. Such holding means do not provide sufficient compression to provide sealing between the cells of the stack but limit any risk of disassembly.

Preferably, each end member comprises a plurality of inner ducts configured to allow fluid circulation through the stacks. The fluids circulate through each stack independently, thereby optimizing such circulation. The end members perform a first compression function and a second fluidic connection function to allow for series or parallel supply.

According to a first embodiment, the modules are directly mounted in series. Such a fuel cell is simple to manufacture and assemble from identical modules that can be directly assembled together.

Preferably, each end member has a mounting face in contact with one of the ends of a stack and an interface face in contact with another interface face of another end member. The mounting face advantageously participates in compressing the cells of a stack.

Preferably, each inner duct opens into the mounting and interface faces of the end member to allow fluid circulation between two successive stacks, that is, in series. Thus, fluid supply and discharge are common to several stacks, thereby limiting complexity, overall size and weight of the supply and discharge system of the stack.

Preferably, the mounting face and the interface face are angularly spaced by an angle α, which is between 0.5° and 60°. Such an angle provides a peripheral shape to the fuel cell.

According to a second embodiment, the fuel cell comprises a plurality of independent intermediate members, each intermediate member being mounted between two successive modules. Preferably, each module has two end faces that are parallel to each other. Such a module, straight or rectilinear, has a simple and inexpensive design, which is advantageous. The peripheral shape is advantageously imparted by the intermediate members.

Preferably, the fuel cell comprises clamping means mounted at the outer periphery of the fuel cell so as to compress the stacks. Preferably, the clamping means apply a direct load to the end and/or intermediate members to indirectly compress the stacks. This allows the cells of the different stacks to be compressed homogeneously and thus optimizes sealing between the cells. Preferably, the clamping means are not in direct contact with the stacks so as not to interfere with the compression of the cells of the stacks and sealing between the cells. Advantageously, the clamping means apply a compression load directed toward the center of the peripheral structure (substantially radial) which is converted into a compression load orthogonal to each mounting face, that is, along the axis of the stack.

Preferably, the clamping means comprise a strap mounted at the circumference of the peripheral structure. Preferably, the strap is peripheral. Thus, a single strap is used to compress the cells of the stack, thereby limiting the number of elements required and providing homogeneous compression throughout the stacks.

Preferably, each end member comprises a mounting groove configured to cooperate with the clamping means. Preferably, the mounting groove is formed on a radially external surface of the end member relative to the center of the peripheral structure. The strap is thus guided during clamping to optimize the compression load exerted on the peripheral structure. In addition, the strap applies the compression load to the end members to avoid any flexural stress on the stacks.

According to another aspect of the invention, the fuel cell comprises a first stack and a second stack that are connected by an interface system having two mounting faces that are adapted to cooperate with the first stack and the second stack, respectively. Preferably, the mounting faces are oblique and preferably spaced apart by an interface angle between 1° and 120°. According to a first embodiment, the interface system consists of two end members. According to a second embodiment, the interface system consists of two end members and an intermediate member.

Thus, each interface system performs an angular wedge function for forming the peripheral structure. Advantageously, conventional stacks can be assembled to form the peripheral structure by virtue of the angular wedges. The interface angle allows the dimension of the peripheral structure to be set. The smaller the interface angle, the larger the peripheral structure. On the contrary, the larger the interface angle, the smaller the peripheral structure. An interface angle between 30° and 90° provides a good compromise between power and overall size. By virtue of the invention, the dimension of the structure can be set by using adapted interface members, the stacks advantageously remaining identical to each other.

The invention also relates to a method for making a fuel cell as presented above, said method comprising:
- a step of assembling in series a plurality of stacks of electrochemical cells so as to form a peripheral structure, and
- a step of clamping the peripheral structure in order to compress the cells of the stacks.

By virtue of the method according to the invention, the stacks are compressed by virtue of the clamping of the peripheral structure. This makes it possible to exert a compression load on all the cell stacks using, for example, a single strap. Moreover, the compression load is homogeneous throughout the stacks.

Preferably, the method comprises a step of pre-stressing the stacked cells in order to hold them together during the assembly step. Thus, the cells of each stack are held together, which makes it easy to assemble the stacks.

BRIEF DESCRIPTION OF THE DRAWINGS

The invention will be better understood upon reading the following description, given only by way of example, and referring to the appended drawings given as non-limiting examples, in which identical references are given to similar objects and in which.

It should be noted that the figures set out the invention in detail to implement the invention, said figures may of course serve to better define the invention where appropriate.

DETAILED DESCRIPTION

Figure 1:
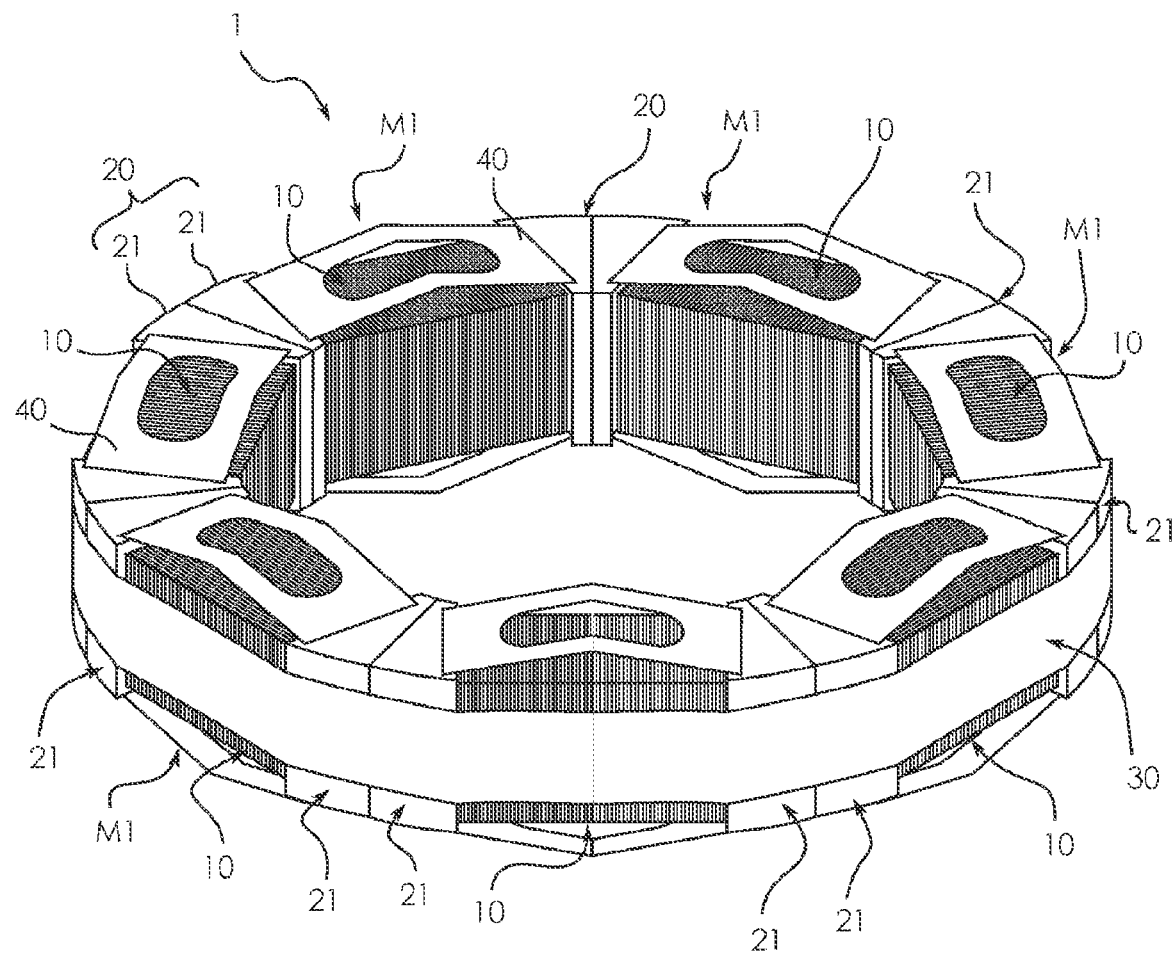
FIG. 1 is a schematic view of a fuel cell according to the invention.

FIG. 1 represents a fuel cell 1 generating electric energy from an electrochemical reaction.

Conventionally, different fluids circulate through the fuel cell 1 in order to react together and thus generate electric energy. Such a reaction can especially be an oxidation-reduction reaction between dioxygen and dihydrogen. The fuel cell 1 is thus supplied with dioxygen and dihydrogen. The oxidation-reduction reaction also generates water which is discharged from the fuel cell 1. In a preferred embodiment, the fuel cell 1 is a high-temperature fuel cell in which water generated by the reaction is in the vapor state. Indeed, vapor-state water is easily discharged as will be described later.

The fuel cell 1 is also supplied with cooling fluid in order to remove heat generated by the electrochemical reaction. Such a cooling fluid is a heat transfer fluid, such as oil or water, which can be mixed with additives.

According to the invention, with reference to FIG. 1, the fuel cell 1 comprises a plurality of stacks 10 of electrochemical cells, the stacks 10 being associated in series with each other so as to form a peripheral structure. The fuel cell 1 comprises a plurality of stacks 10 connected to each other by a plurality of interface systems 20 and clamping means 30 in contact with the interface systems 20 for compressing the cells of each stack 10 together.

Each stack 10 comprises a plurality of cells stacked with each other. Since the stacks 10 are identical, only one stack 10 will now be set forth for the sake of clarity.

Figure 2:
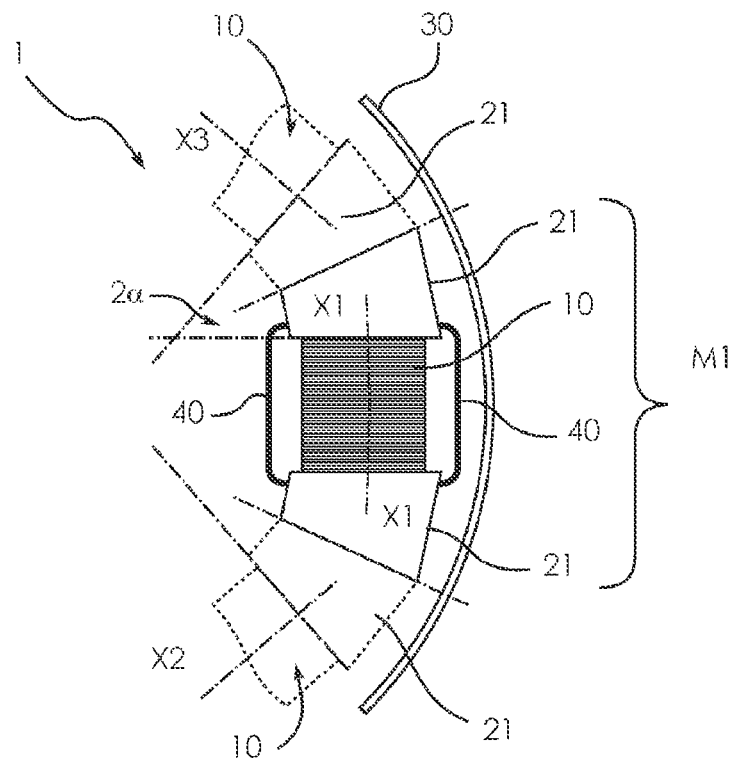
FIG. 2 is a schematic top view of a first module of a fuel cell.

As illustrated in FIG. 2, the cells in the stack 10 are stacked along a longitudinal axis X1 to form a stack of cells. The stack 10 thus extends along the axis X1 between two ends. Each cell is in the form of a plate extending substantially orthogonal to the axis X1.

A cell comprises two electrodes at which the electrochemical reaction generating electric energy takes place. To carry out such a reaction, a cell is supplied with different fluids, especially dioxygen and dihydrogen. Such a cell is also referred to as an electrochemical cell.

A cell comprises openings, also referred to as "cut-outs", passing through the plate. The openings of the different cells are aligned with each other so as to form channels extending longitudinally along the axis X1. Seals (not represented) are placed between two adjacent cells and comprise openings to seal the channels together, while allowing fluids to be channeled across the faces of each cell. When the cells are compressed, the seals between the cells are compressed to seal the channels.

In this example, the stack 10 comprises three supply channels and three discharge channels for the separate circulation of three fluids through the cells: dihydrogen, dioxygen and a coolant. The vapor-state water generated by the oxidation-reduction reaction advantageously does not need a channel to be discharged, which limits the complexity of the stack 10 and makes such discharge easy. As such a structure of a stack 10 is known, it will not be described in further detail.

According to the invention, the stacks 10 are successively mounted with each other so as to form a peripheral structure as illustrated in FIG. 1. In other words, the peripheral structure of the fuel cell 1 is formed by a plurality of stacks 10 distributed at the circumference of the peripheral structure. Still in other words, each stack 10 is connected to two other stacks 10 placed on either side of the stack 10 to achieve a series mounting. To enable such an assembly, the interface systems 20 are mounted between two successive stacks 10.

In FIG. 1, the stack assembly 10 forms a polygonal shaped peripheral structure. However, the stacks 10 could also have a curved shape, with each cell then comprising a variable thickness on its surface, in order to form a circular shaped peripheral structure. In both of these embodiments, the peripheral structure has a loop shape defining an empty space in the center of the peripheral structure. The peripheral structure thus forms an enclosure around this empty space. Such an empty space can be used to install other equipment of the fuel cell 1 and thus limit its overall size. Hereinafter, a center is defined for the peripheral structure and the terms "radially internal" and "radially external" are defined with respect to the center of the peripheral structure.

As illustrated in FIG. 1, each interface system 20 is mounted between two successive stacks 10. The structure and function of each interface system 20 will be set forth in more detail with reference to the embodiments which will now be set forth.

With reference to FIG. 1, the fuel cell 1 comprises a plurality of first modules M1 directly mounted in series with each other so as to form the peripheral structure of the fuel cell 1.

As illustrated in FIG. 2, each first module M1 comprises two end members 21 and a stack 10 mounted between the two end members 21. The first modules M1 are directly mounted in series, with the end members 21 also providing an interface function to allow the orientation of the stacks 10 to be changed with each other. Because of its modular structure, the number of elements required to form the peripheral structure is reduced.

Figure 3:
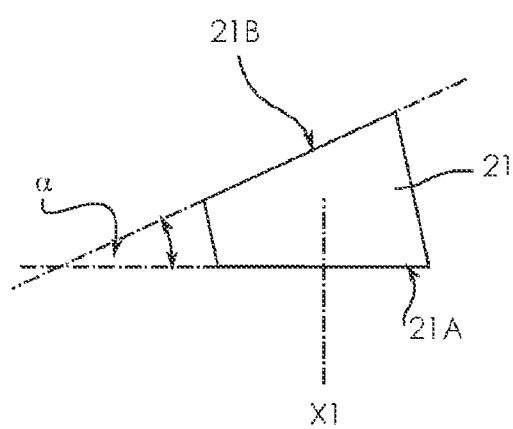
FIG. 3 is a schematic view of an end member of a first module of FIG. 2.

As illustrated in FIGS. 1 through 4, each end member 21 is wedge-shaped and comprises a mounting face 21A in contact with one of the ends of a stack 10 and an interface face 21B opposite to the mounting face 21A for contacting another interface face 21B of another end member 21. The stack 10 is sealingly mounted between the mounting faces 21A of the end members 21. The mounting face 21A extends orthogonally to the axis X1 along which the stack 10 extends. As illustrated in FIG. 3, in the plane of the peripheral structure, the mounting face 21A and the interface face 21B are angularly spaced apart by an angle α, which is between 0.5° and 60°, preferably between 15° and 45°.

Each end member 21 comprises inner fluid supply and discharge ducts. These inner ducts allow dihydrogen, dioxygen, and coolant to circulate through the cells of a stack 10 to ensure proper operation of the electrochemical reaction. The inner ducts are fluidly connected to the channels of the stack 10 and/or to a fluid supply block. An end member 21 is thus sealingly mounted to a stack 10, especially with a seal mounted therebetween, in order to allow fluid exchange between the end member 21 and the stack 10.

Figure 5:
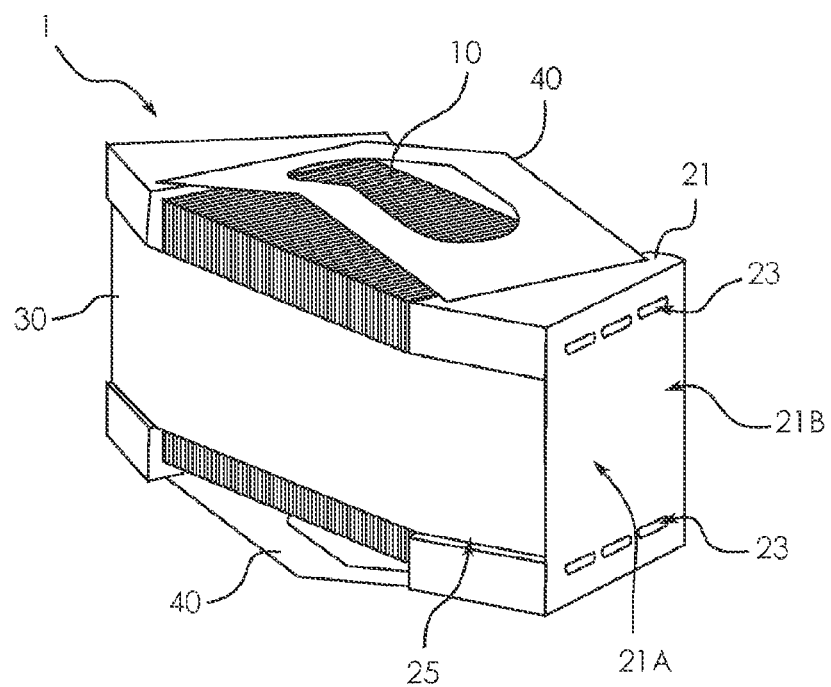
FIG. 5 is a schematic view of a first module with a first embodiment of an end member.

With reference to FIG. 5, according to a first embodiment, each end member 21 has inner ducts opening at the mounting face 21A (not visible) and at the interface face 21B in communication ports 23. When two end members 21 are mounted adjacent to each other along their interface faces 21B, the communication ports 23 of said interface faces 21B are aligned in order to fluidly communicate several successive stacks 10 with each other. Thus, fluid supply and discharge are common to all the stacks 10. This limits the number of fluid inlets and outlets to the fuel cell 1. The stacks 10 are fluidly connected in series.

Figure 6:
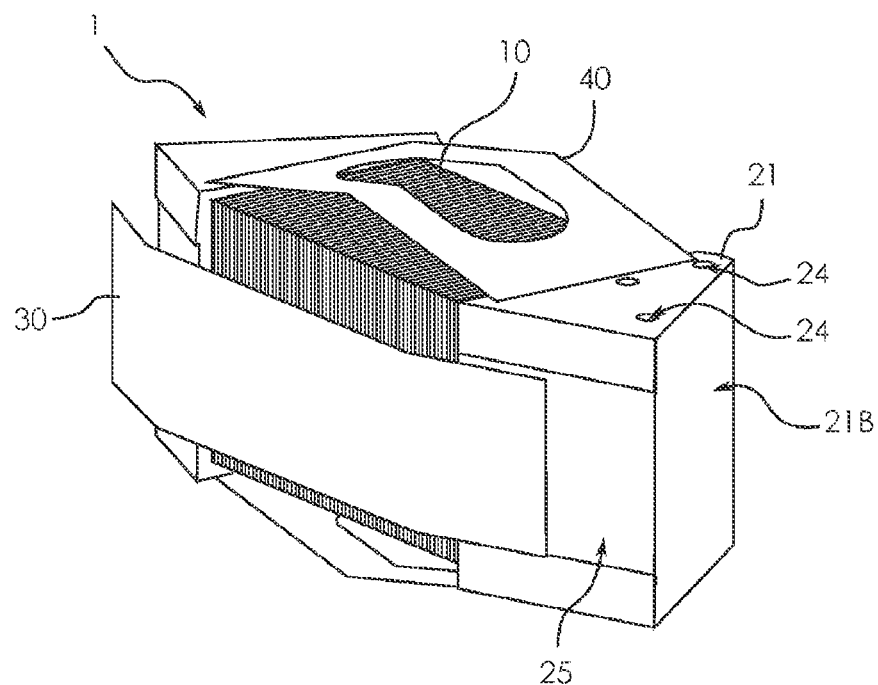
FIG. 6 is a schematic view of a first module with a second embodiment of an end member.

According to a second embodiment, with reference to FIG. 6, an end member 21 comprises inner ducts opening, on the one hand, at the mounting face 21A and, on the other hand, at a face orthogonal to the mounting face 12A in supply ports 24. Such an end member 21 makes it possible to participate in supplying and discharging fluids from the stack 10. Such an end member 21 enables a fluid inlet or a fluid outlet to be formed for the fuel cell. Alternatively, with such end members 21, each stack 10 can be individually supplied with fluids. The supplies are segregated. Thus, advantageously, the stacks 10 can be fluidly associated in series or in parallel.

Figure 4:
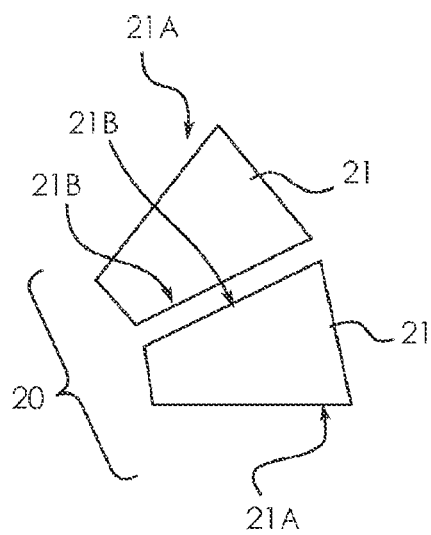
FIG. 4 is a schematic view of an assembly of two end members to form an interface system.

With reference to FIG. 4, when the fuel cell 1 comprises first modules M1, the interface system 20, separating two stacks 10, is formed by the two end members 21 of two adjacent first modules M1. The mounting faces 21A of two end members 21 allow two successive stacks 10 to be angularly spaced apart by an interface angle equal to $2a$ as illustrated in FIG. 2. The two mounting faces 21A extend respectively orthogonal to the axes X1, X3 of the stacks 10. As will be set forth later, this advantageously allows the end members 21 to exert an axial compression load on each stack 10 so as to provide, especially, sealing.

Preferably, the interface angle is between 1° and 120°. The interface angle is used to set the size of the peripheral structure. The smaller the interface angle, the larger the peripheral structure. On the contrary, the larger the interface angle, the smaller the peripheral structure. An interface angle between 30° and 90° provides a good compromise between capacity and overall size. By virtue of the invention, the size of the structure can be set by using adapted interface systems 20, the stacks 10 advantageously remaining identical to each other. In this example, the fuel cell 1 has an internal radius of between 35 and 40 cm.

The fuel cell 1 further comprises holding means for holding the cells of a stack 10 together to prevent any disassembly. Preferably, each first module M1 comprises holding means. As illustrated in FIGS. 1, 5 and 6, the holding means are in the form of spring leaves 40, but of course other holding means could be suitable, for example, straps or outer tie rods. Elastic holding means are advantageous because they allow deformation during final clamping. Each spring leaf 40 comprises two mounting ends connected to each other by an elastic portion. Each mounting end is mounted on an end member 21 mounted to one end of the stack 10. In other words, a spring leaf 40 is mounted to both end members 21 mounted at both ends of the stack 10. The elastic portion is configured to deform upon mounting the mounting ends in order to exert a compression load along axis X1. The elastic portion is also configured to deform when the stack 10 is compressed by the clamping means as will be described later. In other words, the spring leaves 40 allow the cells of the stack 10 to be pre-compressed through the end members 21 in order to hold them in place and thus facilitate assembly of the peripheral structure of the fuel cell 1.

As illustrated in FIGS. 5 and 6, the fuel cell 1 comprises two spring leaves 40 mounted on either side of the stack 10 in order to homogeneously compress the cells along axis X1. Preferably, each spring leaf 40 is recessed in order to allow discharge of heat, especially generated by the stack 10, through this recess.

According to one aspect of the invention, a stack 10, two end members 21 and two spring leaves 40 connecting the end members 21 together form a first module M1 that can be easily handled and assembled. A plurality of first modules M1 are successively assembled to form the fuel cell 1 as will be set forth later.

As illustrated in FIG. 1, the fuel cell 1 comprises clamping means 30 mounted at the outer periphery of the fuel cell 1 so as to compress the first modules M1 together. In other words, the clamping means apply a load to indirectly compress the stacks. This allows the cells of the different stacks to be compressed homogeneously and thus optimizes sealing between the cells. Preferably, the clamping means are not in direct contact with the stacks 10 so as not to interfere with compression of the cells of the stacks and sealing between the cells. Advantageously, the clamping means apply a compression load directed toward the center of the peripheral structure (substantially radial) which is converted into a compression load along the axis of each stack 10.

With reference to FIG. 1, the clamping means are in the form of a strap 30. The strap 30 can be clamped in a conventional manner around the peripheral structure.

As illustrated in FIGS. 5 and 6, each end member 21 also comprises a mounting groove 25 for mounting and guiding the clamping means. Such a mounting groove 25 is formed on the radially external face of the end member 21. Thus, the clamping means 30 are mounted in contact with the end members 21. The clamping means 30 are not in contact with the stacks 10. This avoids any flexural deformation of the stacks 10 as will be described later. The clamping means are mounted at the outer periphery of the peripheral structure of the fuel cell 1. The clamping means are mounted in the grooves 25 of the end members 21 in order to be held in place and guided during clamping.

Advantageously, since each end member 21 is loaded in compression and no longer in flexure, the end member 21 can be made of a less strong and therefore less heavy and expensive material.

As a result of clamping, the diameter of the peripheral structure is reduced. Due to the wedge shape of each end member 21, the clamping force induces a radial load on the end members 21 which results into a compression load orthogonal to each mounting face 21A. The cells of the various stacks 10 are then compressed together which has the effect of compressing the seals and thus providing sealing at the cells. A strap 30 has been set forth, but it goes without saying that the clamping means could be in any other form, especially a belt.

Advantageously, the strap 30 is configured to adapt to thermal expansions of the stacks 10 upon operating the fuel cell 1, thereby holding the cells compressed over time.

Figure 7:
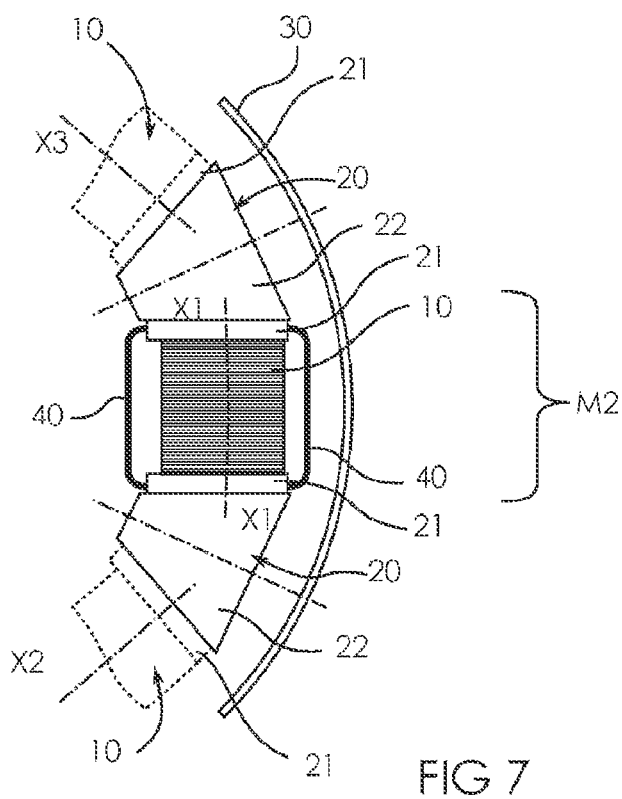
FIG. 7 is a schematic top view of a second module of a fuel cell mounted between two intermediate members and FIG. 8 is a schematic view of an assembly of two end members and an intermediate member to form an interface system.
Figure 8:
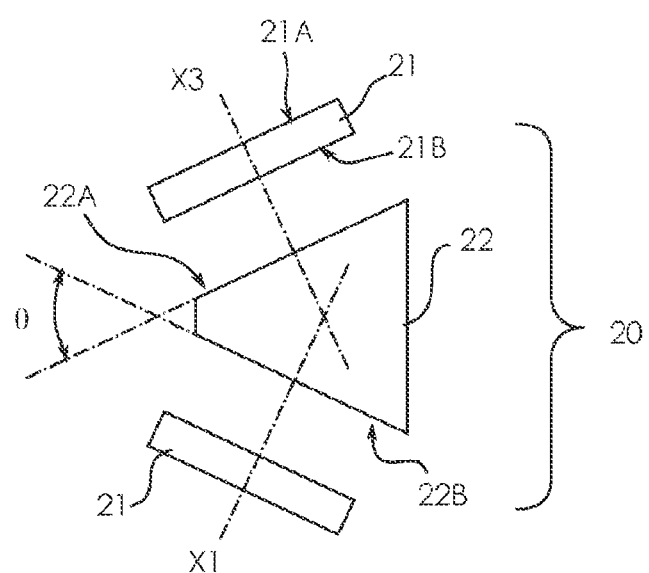

According to an embodiment illustrated in FIGS. 7 and 8, the fuel cell 1 comprises a plurality of modules M2 and a plurality of intermediate members alternately mounted with each other so as to form the peripheral structure. For the sake of clarity, the modules M2 are referred to as second modules M2.

Similarly to above, each second module M2 comprises two end members 21 and a stack 10 mounted between the two end members 21.

In this embodiment, the end member 21 is not in the form of a wedge having a mounting face 21A and an interface face 21B which are oblique. The end member 21 has a mounting face 21A and an interface face 21B that are parallel, thereby reducing its cost.

Similarly to above, each end member 21 has inner ducts opening at the mounting face 21A and at the interface face 21B. Similarly, each second module M2 comprises holding means 40 connecting the end members 21 so as to hold the assembly together. As an end member 21 has been previously set forth, it will not be described again.

In this embodiment, with reference to FIGS. 7 and 8, the intermediate member 22 is in the form of a wedge having two faces 22A, 22B which are oblique so as to cooperate with two different second modules M2 in order to change their orientation. Hereafter, the intermediate angle formed between the two faces 22A, 22B of the intermediate member 22 is referred to as $\Theta$. The intermediate angle $\Theta$, which corresponds to the interface angle, is between 1° and 120°, preferably between 30° and 90°.

Analogously to an end member, an intermediate member 22 has inner ducts in order to fluidly communicate the second modules M2 with which it is in contact.

In this second embodiment, the end member 21 has a simpler structure, which allows the manufacturing cost to be reduced. Advantageously, with a same second module M2, several fuel cell sizes can be achieved by choosing the intermediate members 22 with the adapted intermediate angle $\Theta$.

A method for making a fuel cell 1 according to the invention will now be set forth.

First, cells are stacked in order to form the stacks 10. For this purpose, the cells are placed on top of each other using guides inserted in the guide ports so that the individual cell openings are aligned.

An end member 21 is then mounted at each end of the stack 10 and the spring leaves 40 are mounted to the end members 21 in order to pre-compress the cells of the stack 10. For this purpose, the mounting ends of each spring leaf 40 are mounted in the notches of the end members 21. To mount two mounting ends, the elastic portion deforms which has the effect of compressing the cells when the mounting ends are mounted. The stack 10, two end members 21 the spring leaves 40 thus form an assembly that can be easily handled without the risk of unstacking the cells that are held by the spring leaves 40. Upon mounting a stack 10 to an end member 21, these are fluidly connected to allow fluid circulation.

To form a fuel cell from first modules M1, the first modules M1 are mounted directly with each other in order to form the peripheral structure of the fuel cell 1. Two successive stacks are angularly spaced by a value $2\alpha$. The peripheral structure can then be clamped with a strap 30 as previously described to compress the peripheral structure.

This radial load is transmitted to the stacks 10 so as to exert a compression load. Thus, each stack 10 is compressed along its axis and is not flexurally deformed, which ensures sealing between the cells. During clamping, the elastic portion of the spring leaves 40 is deformed to allow greater compression of the cells and provide sealing. The fuel cell 1 is fluidly connected to a fluid, especially dihydrogen, dioxygen and coolant, supply system.

To form a fuel cell from second modules M2, intermediate members 22 and second modules M2 are alternately mounted in order to change the angular orientation of the stacks 10 relative to each other. Two successive stacks are angularly spaced apart by a value $\Theta$. The intermediate members 22 and the second modules M2 are in fluid communication to allow fluid circulation. The peripheral structure can then be clamped with a strap 30 as described above.

According to one aspect of the invention, a stack 10 of the peripheral structure can be replaced by a fluid supply module, in particular, if the dimensions of the interface systems 20 do not allow for supply ports 24.

Such a peripheral structure, in which the stacks 10 have different orientations, is particularly advantageous for a high temperature fuel cell. This is because water vapor generated by the reaction can be easily discharged from a stack 10 regardless of the orientation of the stack 10.

Preferably, the fuel cell can be positioned flat, that is, in a horizontal plane, in proximity to the center of a drone whose axisymmetric structure is compatible with the annular shape of the stack.

For longitudinal devices, for example, an aircraft or a submarine, the fuel cell can advantageously be positioned in a vertical plane to limit its overall size in the cylindrical structure of such a device.

Advantageously, the space in the center of the peripheral structure can be used to house other equipment, especially equipment related to the fuel cell (tanks, etc.) in order to limit length of the connections and obtain a compact assembly.

The invention claimed is:

1. A fuel cell comprising a plurality of modules mounted in series with each other so as to form a peripheral structure, each module comprising two end members and a stack of electrochemical cells mounted between the two end members, each end member of each module having a mounting face in contact with one of two ends of the stack of the module and an interface face in contact with another interface face of another end member, the mounting face of each end member and the interface face of each end member being angularly spaced apart by an angle $\alpha$, which is between 0.5° to 60°.

2. The fuel cell according to claim 1, wherein each respective module has a holding means connecting the two end members of the respective module in order to hold the stack of the respective module restrained between the two end members of the respective module.

3. The fuel cell according to claim 1, wherein at least one holding means is in the form of spring leaves.

4. The fuel cell according to claim 1, wherein each end member comprises a plurality of inner ducts configured to allow fluid circulation in each of the stacks.

5. The fuel cell according to claim 1, wherein the plurality of modules are directly mounted in series.

6. The fuel cell according to claim 1, comprising clamping means mounted at an external periphery of the fuel cell so as to compress the stacks.

7. The fuel cell according to claim 6, wherein the clamping means comprise a strap mounted at a circumference of the peripheral structure.

8. The fuel cell according to claim 6, wherein each end member comprises a mounting groove configured to cooperate with the clamping means.

9. A method for making the fuel cell according to claim 1, said method comprising:
a step of assembling in series a plurality of stacks of electrochemical cells so as to form a peripheral structure, and
a step of clamping the peripheral structure in order to compress the cells of the stacks.

10. A fuel cell comprising a plurality of modules mounted in series with each other so as to form a peripheral structure with an opening formed internally of the peripheral structure, wherein:
each module comprises two end members and a stack of electrochemical cells mounted between the two end members;
each end member of each module having a mounting face and an interface face;
each mounting face of each end member of each module in contact with an end of the stack of the module;
each interface face of each end member in contact with the interface face of another end member; and
wherein the mounting face of each end member and the interface face of each end member are angularly spaced apart by an angle $\alpha$, which is between 0.5° to 60°.

11. The fuel cell according to claim 10, wherein each respective module has a holding means connecting the stack between the two end members of the respective module.

12. The fuel cell according to claim 10, wherein each end member comprises a plurality of inner ducts configured to allow fluid circulation in each of the stacks.

13. The fuel cell according to claim 10, wherein a clamping means comprises a strap mounted at a circumference of the peripheral structure.

14. The fuel cell according to claim 13, wherein each end member comprises a mounting groove configured to cooperate with the clamping means.

* * * * *